United States Patent
Kikuchi et al.

(10) Patent No.: US 7,395,154 B2
(45) Date of Patent: Jul. 1, 2008

(54) NAVIGATION APPARATUS AND ARRIVAL DETECTION METHOD

(75) Inventors: Masanori Kikuchi, Okazaki (JP);
Takashi Kuno, Okazaki (JP); Akiko Matsuo, Okazaki (JP); Kazuyuki Watanabe, Okazaki (JP); Mikio Shimadue, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 249 days.

(21) Appl. No.: 11/050,943

(22) Filed: Feb. 7, 2005

(65) Prior Publication Data

US 2005/0192743 A1 Sep. 1, 2005

(30) Foreign Application Priority Data

Feb. 27, 2004 (JP) ............................. 2004-054391

(51) Int. Cl.
*G01C 21/34* (2006.01)
(52) U.S. Cl. .................... 701/211; 701/209; 340/995.19
(58) Field of Classification Search ......... 701/200–202, 701/208–214, 23–26; 342/357.06; 340/988, 340/995.19, 994
See application file for complete search history.

(56) References Cited

U.S. PATENT DOCUMENTS

| | | | | |
|---|---|---|---|---|
| 5,793,631 A | * | 8/1998 | Ito et al. | ...... 701/211 |
| 6,172,643 B1 | * | 1/2001 | Toedter | ...... 342/417 |
| 6,909,968 B2 | * | 6/2005 | Yokota | ...... 701/211 |

FOREIGN PATENT DOCUMENTS

| | | |
|---|---|---|
| EP | 0 583 773 A2 | 2/1994 |
| EP | 0 699 894 A2 | 3/1996 |
| EP | 0 779 498 A2 | 6/1997 |
| JP | A 07-055488 | 3/1995 |
| JP | A-07-063568 | 3/1995 |

\* cited by examiner

*Primary Examiner*—Yonel Beaulieu
(74) *Attorney, Agent, or Firm*—Oliff & Berridge, PLC

(57) ABSTRACT

A navigation apparatus and arrival detection method detect a current location of a vehicle and searches for a route to a set destination. The apparatus and method provide guidance to the destination along the searched route and determine whether the destination is set within a car-free area. If it is determined that the destination is set within the car-free area, the apparatus and method expand an arrival detection area for the destination, and terminate the guidance to the destination when it is determined that the vehicle is within the expanded arrival detection area. Alternatively, even if the destination is not within a car-free area, after an engine of a vehicle is shut off and restarts, the navigation apparatus and method expand an arrival detection area for the destination, and terminate the guidance to the destination when the vehicle is within the expanded arrival detection area.

20 Claims, 3 Drawing Sheets

NAVIGATION APPARATUS AND ARRIVAL DETECTION METHOD

INCORPORATION BY REFERENCE

The disclosure of Japanese Patent Application No. 2004-054391 filed on Feb. 27, 2004 including the specification, drawings and abstract are incorporated herein by reference in their entirety.

BACKGROUND

1. Related Technical Fields

Related fields include navigation apparatus and arrival detection methods.

2. Description of the Related Art

In a conventional navigation apparatus and method, a vehicle is determined to have arrived at a destination (or at a passing point) if a distance between the vehicle location and the destination is shorter than a predetermined distance and if the vehicle is traveling on the link nearest to the destination (refer to, for example, Japanese Unexamined Patent Application Publication No. H7-55488).

SUMMARY

According to the aforementioned navigation apparatus and method, arrival at the destination is determined based on the assumption that the destination can be approached by the vehicle. Therefore, if the destination is within a car-free area, i.e., cannot be approached by vehicle, arrival at the destination will not be detected. Thus, if a user parks a vehicle, for example, at a closest parking lot some distance away from the destination and reaches the destination on foot, the navigation apparatus will consider the trip incomplete and keep guiding to the destination when the user returns to the vehicle unless the destination is deleted manually.

Accordingly, it is beneficial to provide a navigation apparatus that detects arrival to a destination even if the destination is set within a car-free area.

It is beneficial to provide a navigation apparatus, including a controller that detects a current location of a vehicle and searches for a route to a set destination. The controller provides guidance to the destination along the searched route and determines whether the destination is set within a car-free area. If it is determined that the destination is set within the car-free area, the controller expands an arrival detection area for the destination, and the controller terminates the guidance to the destination when it is determined that the vehicle is within the expanded arrival detection area.

It is beneficial to provide a navigation apparatus including a controller that searches for a route to a set destination and provides guidance to the destination along the searched route. After an engine of a vehicle is shut off and restarts, the controller expands an arrival detection area for the destination, and the controller terminates the guidance to the destination when the vehicle is within the expanded arrival detection area.

It is beneficial to provide an arrival detection method, including detecting a current location of a vehicle, searching for a route to a set destination, and providing guidance to the destination along the searched route. The method includes determining whether the destination is set within a car-free area, expanding, when it is determined that the destination is set within the car-free area, an arrival detection area for the destination, and terminating the guidance to the destination when the vehicle is within the expanded arrival detection area.

It is beneficial to provide an arrival detection method including searching for a route to a set destination and providing guidance to the destination along the searched route. The method includes expanding, after an engine of a vehicle is shut off and restarts, an arrival detection area for the destination; and terminating guidance to the destination when the vehicle is within the expanded arrival detection area

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
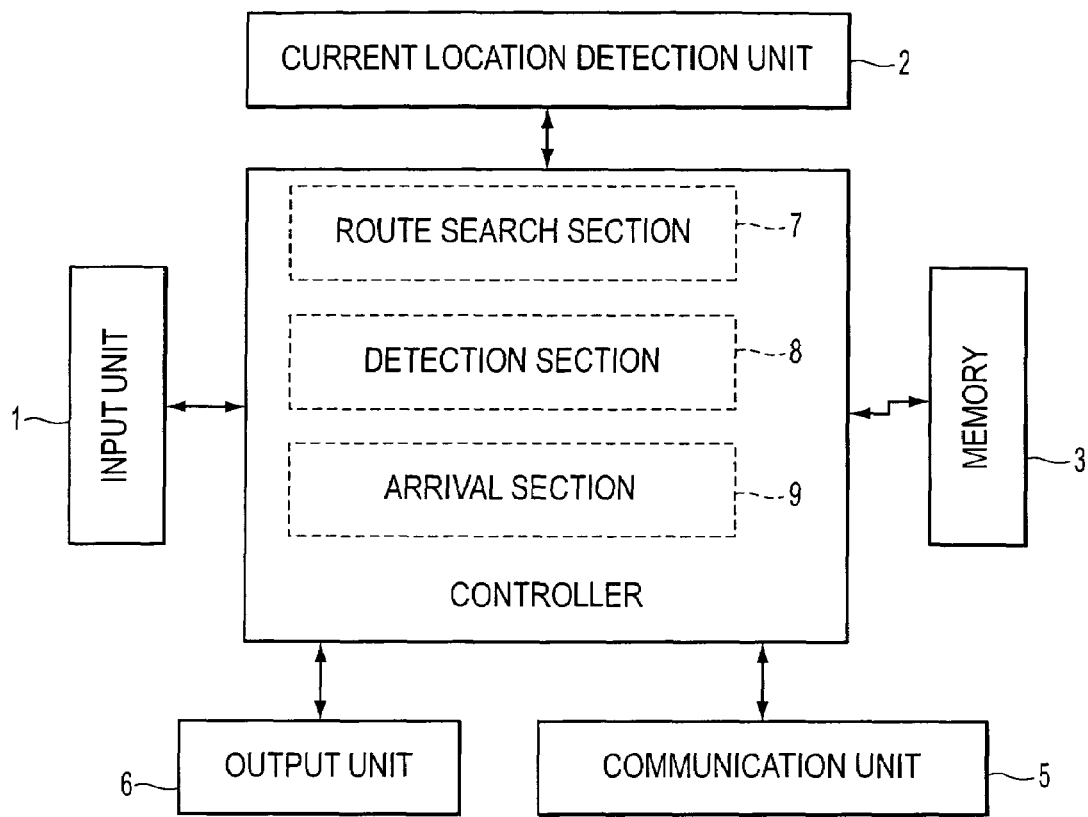
FIG. 1 is a diagram showing an example of the navigation apparatus according to the embodiment of the present invention.

FIG. 1 is a diagram showing an exemplary navigation apparatus. The navigation apparatus may include, for example, an input unit 1 that inputs information relevant to route guidance, such as a place of departure and a destination. The navigation apparatus may include, for example, a current location detector 2 that obtains information relevant to the current location of the vehicle. The navigation apparatus may include, for example, a memory 3 that stores information such as, for example, map data, navigation data necessary for searching for a route, guidance data necessary for providing guidance along the route, and/or instructions (e.g., programs, applications, and/or OS) for displaying a map, searching for a route and/or providing guidance. Guidance may be provided visually and/or audibly.

The navigation apparatus may include a controller 4, for example, that generates a map display, searching for a route, providing display/audio guidance, and/or controlling the overall system. The navigation apparatus may include an communication unit 5, for example, that transmits and/or receives information such as, for example, road information and/or traffic information that relate to the travel of the vehicle. The navigation apparatus may include an output unit 6 including, for example, a display and/or a speaker for outputting information relevant to route guidance.

The controller 4 may be functionally, physically, or conceptually divided into, among other things, a route search section 7, a detection section 8, and/or an arrival section 9. The a route search section 7 may search, for example, a route to a destination when the destination (or a passing point) is set by, for example, the input unit 1. The detection section 8 may determine, for example, whether the destination is set within car-free area. The arrival section 9 may, for example, expand an arrival detection area for the destination when it is determined that the destination is set within car-free area and then may terminates guidance when the vehicle arrives within the area.

Figure 2:
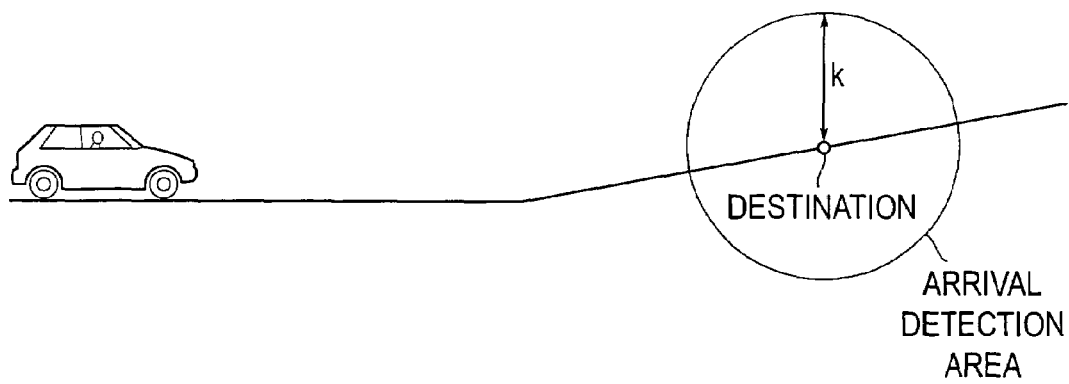
FIG. 2 is a diagram showing an arrival detection area.
Figure 3:
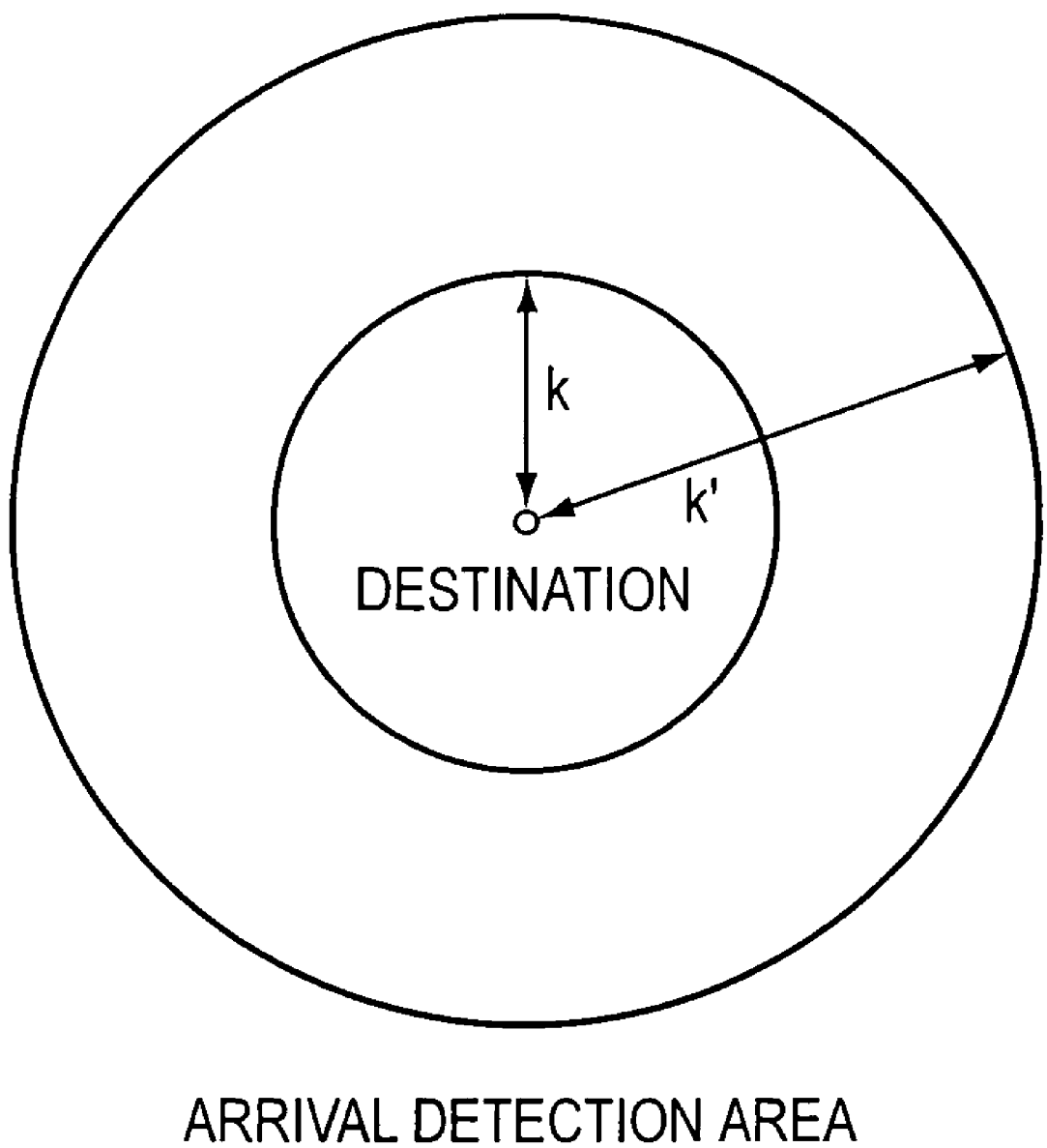
FIG. 3 is a diagram showing an expansion of an arrival detection area.

Next, an exemplary method for arrival detection will be described with reference to FIGS. 2-4. As shown in FIG. 2, a circle whose center point is a destination and that has radius "k" (for example, k=500 m) may be set as an arrival detection area. If a vehicle arrives within that arrival area, it may be determined that the vehicle has arrived at the destination. Accordingly, guidance may be terminated. However, as discussed above, if the destination is set within car-free area such as, for example, a pedestrian only area, private property, property surrounded by closed roads due to construction or security, the vehicle cannot enter the car-free area. As a result, a user must to park the vehicle at some distance away from the destination. Even if the user arrives at the destination on foot, the conventional navigation apparatus keeps guiding to the destination when the user returns to the vehicle and during traveling to the next destination unless the user manually deletes the previous destination data.

Therefore, if a destination is set within car-free area, an arrival detection area whose radius is "k" may be expanded to an area whose radius is k' (for example, k'=2 km) so that an area in which vehicle can enter may be included with the expanded arrival detection area. Thus, when a vehicle arrives within a radius of k', it may be determined that the vehicle arrives at the destination and guidance may be terminated. Note that the arrival detection area may be expanded, for example, when the destination is set, during guidance to the destination, or when a predetermined distance to the destination is reached.

Figure 4:
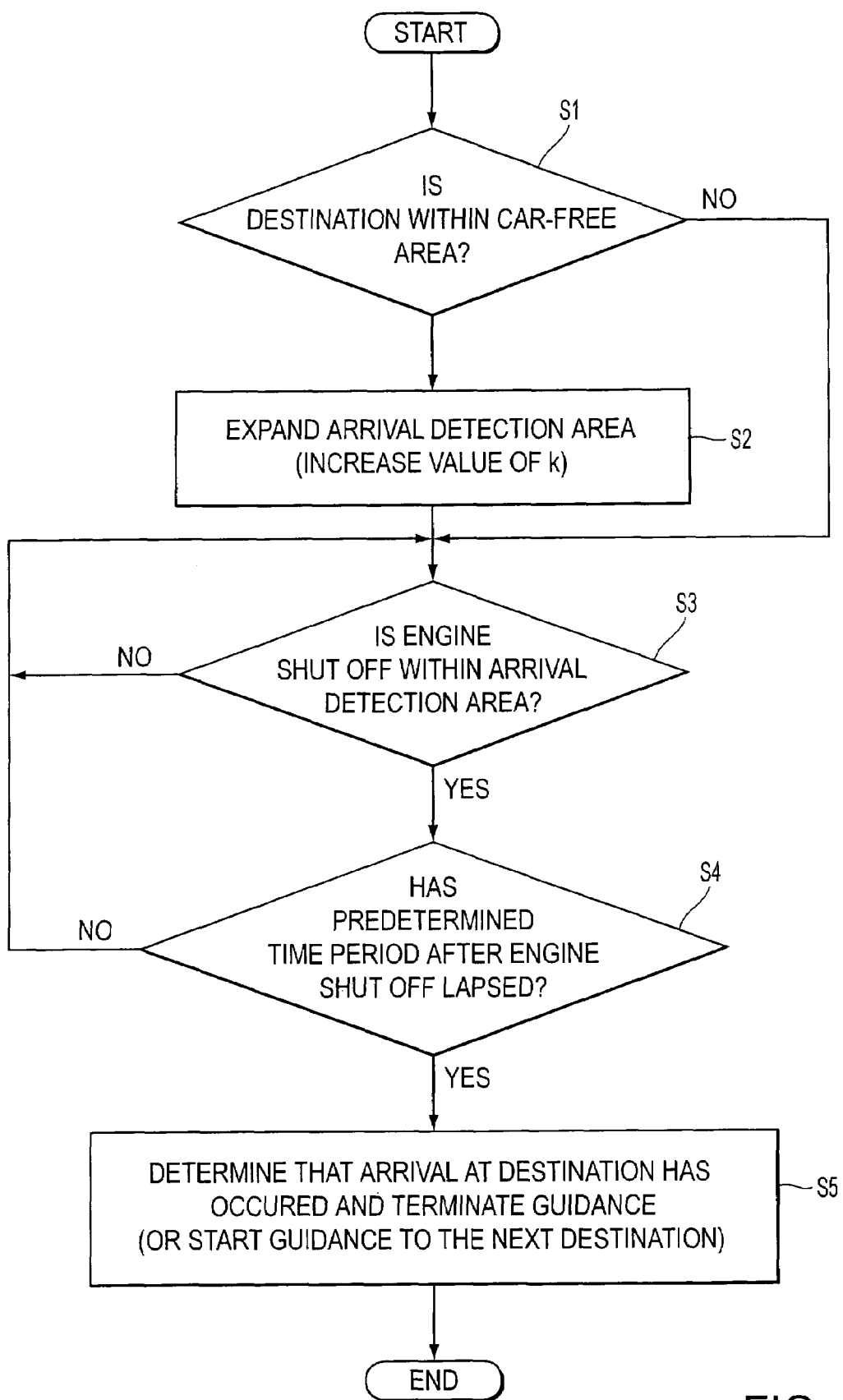
FIG. 4 is a diagram showing an exemplary arrival detection method.

FIG. 4 is a diagram showing an exemplary method for detecting arrival at a destination by expanding an arrival detection area for the destination when the destination is set within car-free area. First, a determination is made whether the destination is set within car-free area (Step S1). If the destination is set within a car-free area, the arrival detection area for the destination is expanded (Step S2). If the destination is not in a car-free area, the expansion of the arrival detection area is not executed. Subsequently, a determination is made whether an engine of the vehicle is shut off within the arrival detection area for the destination (Step S3). If the engine of the vehicle is shut off within the arrival detection area for the destination, it may further be determined whether a predetermined time period is elapsed after the engine of the vehicle is shut off (Step S4).

If the predetermined time period is passed after the engine of the vehicle is shut off, it is determined that arrival at the destination has occurred and then, for example, guidance is terminated. Alternatively, guidance to the next destination may start. In the aforementioned example, arrival to the destination may be detected as of shutting off the engine of the vehicle. Therefore, when the engine of the vehicle restarts, the destination does not need to be manually deleted in order to prevent its being selected as the target destination for subsequent guidance.

Further, according to various other exemplary implementations, arrival to the destination may be detected by expanding the arrival detection distance when the engine of the vehicle restarts. Accordingly, it does not matter whether a predetermined time period is passed to restart the engine or not after the engine is shut off.

Sometimes, although a destination is not within a car-free area, a driver may not be able to approach the destination, for example, because there is no available parking within the original arrival detection distance. Thus, according to various other exemplary implementations, even if the destination is not within car-free area, when the engine of the vehicle is shut off, arrival at the destination may also be detected by expanding the arrival detection distance as of restarting the engine of the vehicle.

While various features have been described in conjunction with the exemplary embodiments outlined above, various alternatives, modifications, variations, and/or improvements of those features may be possible. Accordingly, the exemplary implementations of the invention, as set forth above, are intended to be illustrative. Various changes may be made without departing from the spirit and scope of the invention.

What is claimed is:

1. A navigation apparatus, comprising:
a controller that:
detects a current location of a vehicle;
searches for a route to a set destination, the destination associated with an arrival detection area;
provides guidance to the destination along the searched route; and
determines whether the destination is set within a car-free area;
wherein:
when the controller determines that the destination is set within the car-free area, the controller automatically expands the arrival detection area for the destination, and
the controller terminates the guidance to the destination when the controller determines that the vehicle is within the expanded arrival detection area.

2. The navigation apparatus of claim 1, further comprising an input unit that sets the destination.

3. The navigation apparatus of claim 1, further comprising a current location detection unit that determines the current location of the vehicle, wherein the controller determines whether the vehicle is within the expanded arrival detection area based on the current location of the vehicle.

4. The navigation apparatus of claim 1, wherein the controller determines that the vehicle is within the expanded arrival detection area when an engine of the vehicle is shut off within the expanded arrival detection area.

5. The navigation apparatus of claim 4, wherein the controller determines that the vehicle is within the expanded arrival detection area after a predetermined time is elapsed after the engine of the vehicle is shut off.

6. The navigation apparatus of claim 4, wherein the controller deletes the destination when the engine of the vehicle restarts.

7. A navigation apparatus comprising:
a controller that:
detects a current location of a vehicle;
searches for a route to a set destination, the destination associated with an arrival detection area; and
provides guidance to the destination along the searched route;
wherein:
after an engine of a vehicle is shut off and restarts, and when the vehicle is not within the arrival detection area, the controller automatically expands the arrival detection area for the destination, and
the controller terminates the guidance to the destination when the vehicle is within the expanded arrival detection area.

8. The navigation apparatus of claim 7, further comprising an input unit that sets the destination.

9. The navigation apparatus of claim 7, further comprising a current location detection unit that determines the current location of the vehicle, wherein the controller determines whether the vehicle is within the expanded arrival detection area based on the current location of the vehicle.

10. The navigation apparatus of claim 7, wherein the controller deletes the destination when the vehicle is within the expanded arrival detection area.

11. An arrival detection method, comprising:
detecting a current location of a vehicle;

searching for a route to a set destination;
setting an arrival detection area for the destination;
providing guidance to the destination along the searched route;
determining whether the destination is set within a car-free area;
automatically expanding the arrival detection area, when the destination is set within the car-free area; and
terminating the guidance to the destination when the vehicle is within the expanded arrival detection area.

12. The arrival detection method of claim 11, wherein terminating the guidance to the destination comprises terminating the guidance to the destination when the vehicle is within the expanded arrival detection area and an engine of the vehicle is shut off.

13. The arrival detection method of claim 12, wherein terminating the guidance to the destination, comprises terminating the guidance to the destination when the vehicle is with the expanded arrival detection area, the engine of the vehicle is shut off, and after a predetermined time is elapsed after the engine of the vehicle is shut off.

14. The arrival detection method of claim 11, further comprising deleting the destination when the engine of the vehicle restarts.

15. The arrival detection method of claim 11, wherein the method is implemented by a set of program instructions stored in a memory and executable by a controller.

16. A storage medium storing a set of program instructions executable on a data processing device and usable for performing the method recited in claim 11.

17. An arrival detection method comprising:
detecting a current location of a vehicle;
searching for a route to a set destination;
setting an arrival detection area for the destination;
providing guidance to the destination along the searched route;
automatically expanding, after an engine of a vehicle is shut off and restarts, the arrival detection area when the vehicle is not within the arrival detection area; and
terminating guidance to the destination when the vehicle is within the expanded arrival detection area.

18. The arrival detection method of claim 17, further comprising deleting the destination when the vehicle is within the expanded arrival detection area.

19. The arrival detection method of claim 17, wherein the method is implemented by a set of program instructions stored in a memory and executable by a controller.

20. A storage medium storing a set of program instructions executable on a data processing device and usable for performing the method recited in claim 17.

* * * * *